Jan. 19, 1971 — T. J. GINGUE — 3,556,561
FARM WAGON RUNNING GEAR
Filed Oct. 28, 1968 — 2 Sheets-Sheet 1
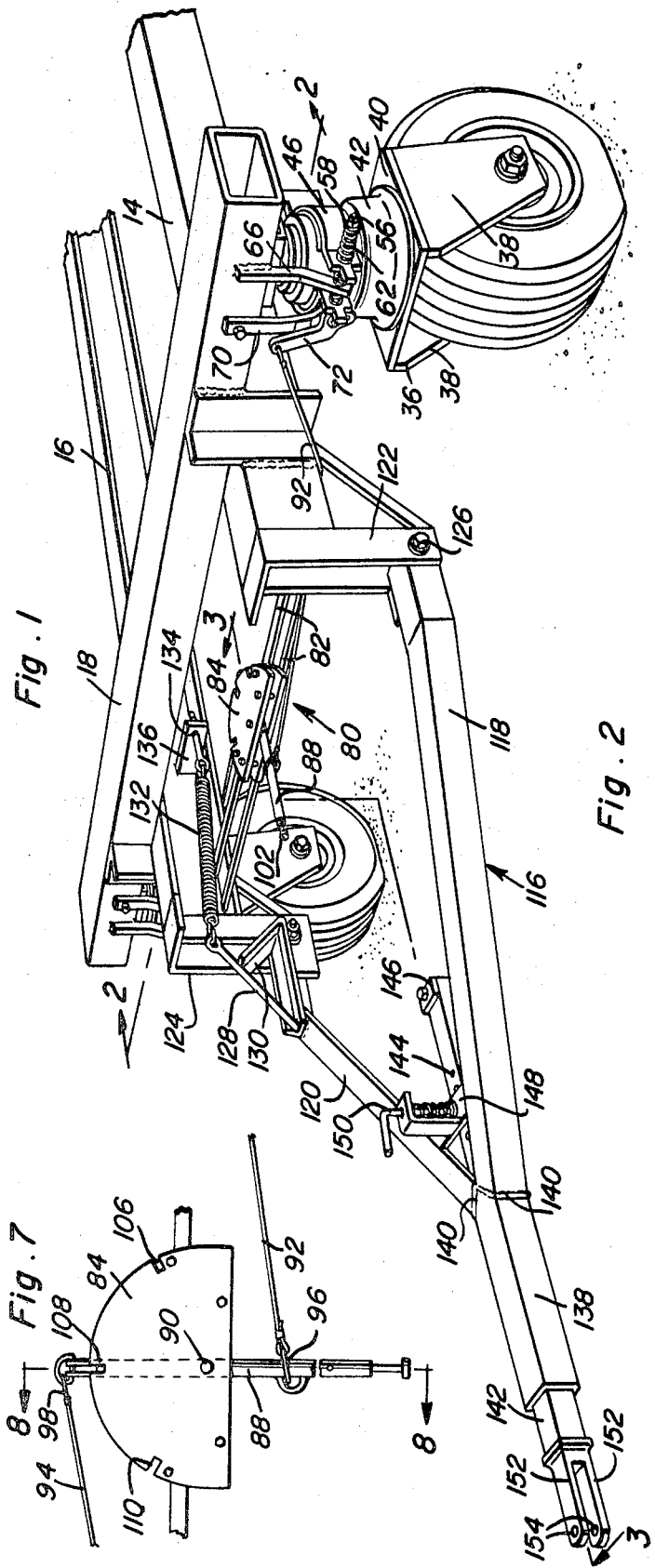
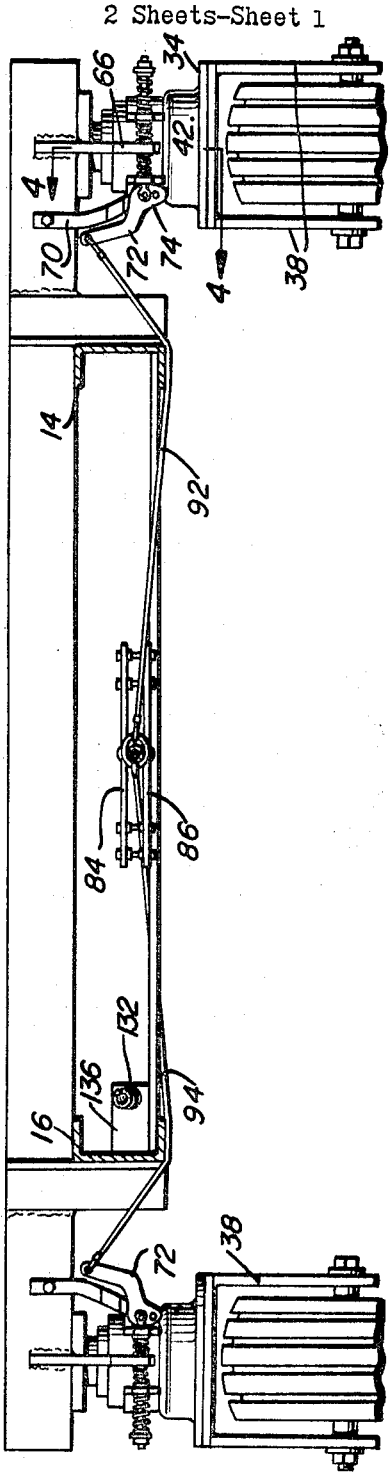
Theodore Joe Gingue
INVENTOR.
BY Clarence A. O'Brien
and Harvey B. Jackson
Attorneys

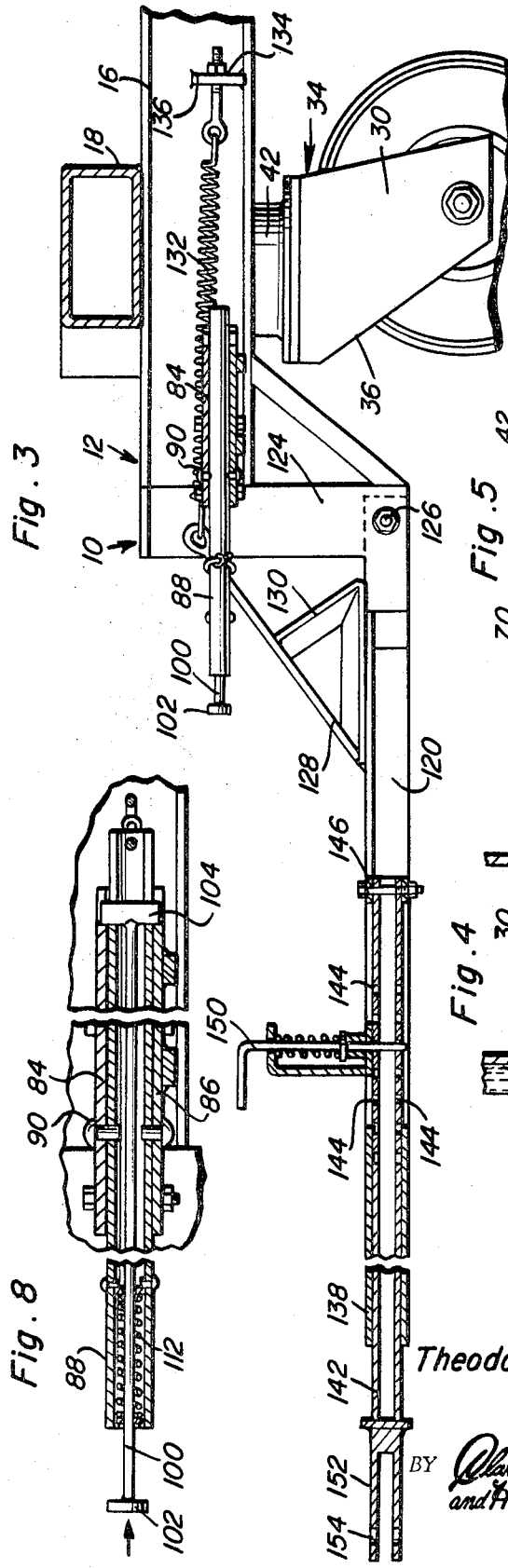

United States Patent Office 3,556,561
Patented Jan. 19, 1971

3,556,561
FARM WAGON RUNNING GEAR
Theodore Joe Gingue, Stiles Pond Road,
St. Johnsbury, Vt. 05819
Filed Oct. 28, 1968, Ser. No. 771,261
Int. Cl. B62d 53/00
U.S. Cl. 280—489    10 Claims

ABSTRACT OF THE DISCLOSURE

A vehicle chassis including a frame having opposite ends. The chassis includes opposite side ground engaging support wheels at one end journalled for rotation about an axis extending transversely of the frame and the other end of the chassis includes opposite side ground engaging caster wheel assemblies rotatable about upstanding axes. The vehicle further includes brake structure associated with the caster wheel assemblies operable to variably brake the assemblies against rotation about their upstanding axes of rotation.

When standard farm wagons are used to transport baled hay and other crops from the field to the barn it is usually necessary to back the wagons up to a door in order to facilitate their unloading. It is extremely difficult to back a conventional farm wagon when it is hitched to a tractor.

The difficulty in backing a farm wagon is a result of the farm wagon being steerable at the front end by means of its towing tongue and the wagon constituting a full trailer, as opposed to a semitrailer, thus preventing the wagon or trailer from being backed in the manner which may be reasonably readily accomplished with a semitrailer.

The main object of this invention is to provide a farm wagon equipped with front caster wheel assemblies and a towing tongue attached directly to the frame of the wagon whereby the wagon may be towed and backed in the same manner in which a semitrailer is pulled and backed.

Another object of this invention, in accordance with the preceding object, is to provide brake assemblies for the front caster wheel assemblies of the wagon operable to variably brake the caster wheel assemblies against rotation about their upstanding axes of rotation. In this manner, when the wagon is being towed forwardly over a road at road speed the caster wheel assemblies will not be allowed to rapidly oscillate or shimmy and yet they will be free to turn as required.

A further object of this invention is to provide a farm wagon in accordance with the immediately preceding object and including brake means whereby the front caster wheel assemblies of the wagon may be fully braked against oscillation about their upstanding axes of rotation.

A final object of this invention to be specifically enumerated herein is to provide a farm wagon in accordance with the preceding objects which conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of the forward end of the wagon;

FIG. 2 is an enlarged fragmentary vertical sectional view taken substantially upon the plane indicated by the section line 2—2 of FIG. 1;

FIG. 3 is an enlarged longitudinal vertical sectional view taken substantially upon the plane indicated by section line 3—3 of FIG. 1;

FIG. 4 is an enlarged fragmentary vertical sectional view taken substantially upon the plane indicated by the section line 4—4 of FIG. 2;

FIG. 5 is a vertical sectional view taken substantially upon the plane indicated by the section line 5—5 of FIG. 4;

FIG. 6 is a side elevational view of the wagon;

FIG. 7 is an enlarged fragmentary plan view of the center portion of the forward end of the wagon illustrating the control assembly for the brake structures by which the forward caster wheel assemblies of the wagon may be variably braked against oscillation;

FIG. 8 is an enlarged fragmentary vertical sectional view taken substantially upon the plane indicated by section line 8—8 of FIG. 7.

Referring now more specifically to the drawings, the numeral 10 generally designates the farm wagon which includes a main frame referred to in general by the reference numeral 12 consisting of opposite side longitudinal frame members 14 and 16 interconnected by means of front and rear transverse beams 18 and 20 over which a flooring assembly referred to in general by the reference numeral 22 is secured.

The wagon 10 includes opposite side depending supports 24 supported from the longitudinal members 14 and 16 and between which a rear axle 26 extends. The rear axle 26 has a pair of opposite side rear ground engaging support wheels 28 journalled thereon.

The opposite ends of the transverse brace 18 include underside support brackets 30 from which depending axle sleeve portions 32 are supported. A pair of identical caster wheel assemblies 34 are disposed at the opposite ends of the transverse beam 18 and include inverted U-shaped body portions 36 each including a pair of depending legs 38 interconnected at their upper ends by means of a bight portion 40. A generally cylindrical upstanding collar 42 is secured to each bight portion 40 and supports a combined journal sleeve and brake drum 44 from its upper end which rotatably receives the corresponding axle sleeve portion 32 therethrough. The lower end of each axle sleeve portion 32 abuts against the upper surface of the corresponding bight portion 40 and the central portions of a pair of partial cylindrical contracting brake bands 46 are supported from the opposite ends of the transverse beam 18 by means of depending support brackets 48 with each brake band 46 disposed about the corresponding journal sleeve and brake drum 44. Each of the brake bands 46 includes a brake lining 50 and the opposite ends of each brake band include parallel mounting ear portions 52 and 54 through which opposite end portions of an actuating rod 46 are slidingly secured. One end of each rod 56 has a threaded nut 58 and an abutment washer 60 mounted thereon with a first compression spring 62 disposed about the rod 56 between the abutment washer 60 and the corresponding mounting edge portion 54. A second compression spring 64 is provided and disposed about the rod 56 between the corresponding mounting ear portion 54 and a depending support 66 supported at its upper end from the corresponding end of the transverse beam 18 and through whose lower end the adjacent rod 56 is slidingly received. A third compression spring 68 is provided and disposed about each rod 56 between the depending support 66 and the corresponding mounting ear portion 52.

Each of the caster wheel assemblies 34 also includes an upright support member 70 whose upper end is supported from the adjacent end of the transverse beam 18 and from whose lower end an actuating lever 72 is pivotally secured. Each of the actuating levers 72 includes a cam surface 74 engaged with the opposing surface portion of the mounting ear portions 52. The ends of the rods 56 slidingly receive through the mounting ear portions 52 include eye portions 76 journalled on eccentric pins 78 carried by the levers 72. Accordingly, it may be seen that movement of the upper ends of the actuating members 72 apart will release the brake band 46 and then movement to the upper and of the actuating levers 72 toward each other will increase the braking action of the brake bands 46 on the brake drums 44.

A control assembly generally referred to by reference numeral 80 and for actuating the levers 72 is provided and is supported from a pair of parallel transverse support bars 82 extending and secured between the forward ends of the longitudinal members 14 and 16. Control assembly 80 includes a pair of spaced apart upper and lower plates 84 and 86 between which an actuating lever 88 is pivotally secured as at 90. The actuating lever has the adjacent ends of a pair of cables 92 and 94 secured thereto as at 96 and 98 and the remote ends of the cables 92 and 94 are secured to the upper ends of the actuating levers 72. The actuating lever 88 is hollow and slidingly receives therethrough an actuating rod 100 including a pushbotton 102 on its end projecting forwardly from the actuating lever 88 and a vertical cross-head 104 on its rear end which is selectively receivable in the pairs of vertically registered notches 106, 108 and 110 formed in the vertically registered semicylindrical edge portion of the plates 84 and 86. The rod 100 is urged to a forward limit position by means of a compression spring 112 disposed within the actuating lever 88 and it may therefore be seen that the crosshead 104 may be engaged in the selected pair of notches so as to retain the actuating lever 88 in selected rotated position.

It is to be noted that when the actuating lever is positioned as illustrated in FIG. 7 of the drawings the brake bands 46 are partially tightened about the brake drum 44 so as to frictionally resist oscillation of the body portions 36 of the caster wheel assemblies 34. When the actuating lever 88 is rotated counterclockwise from the position thereof illustrated in FIG. 7 of the drawings and positioned with the crosshead 104 in the notches 110, the compression springs 64 and 66 act upon the mounting air portions 52 and 54 to spread the latter apart and thereby terminate braking action of the brake bands 46 on the brake drums 44. However, when the actuating lever 88 is rotated in a clockwise direction from the position thereof illustrated in FIG. 7 of the drawings to a position with the crosshead 104 seated in the notches 106, the cables 92 and 94 are tensioned and the upper ends of the actuating levers 72 are pulled toward each other whereby the cam surfaces 74 of the actuating levers 72 will cam the mounting ear portions 52 apart and draw the actuating rods 56 toward each other so as to force the mounting ear portions 54 toward each other thus tightening the brake bands 46 about the brake drums 44 and locking the body portions 36 of the caster wheel assemblies 34 against oscillation.

A tongue assembly referred to in general by the reference numeral 116 is provided and includes a pair of rearwardly divergent arms 118 and 120 pivotally secured at their ends to depending brackets 122 and 124, respectively, carried by the forward ends of the longitudinal members 14 and 16. The rear ends of the arms 118 and 120 are pivotally secured to the lower ends of the brackets 122 and 124 by means of removable pivot fasteners 126 and the rear end of the arm 120 includes an upwardly and rearwardly inclined anchor member 128 suitably braced as at 130 and to which the forward end of an expansion spring 132 is secured. The rear end of the expansion spring 132 is suitably anchored as at 134 to an anchor bracket 136 carried by the longitudinal member 16 rearwardly of its forward end.

The tongue assembly 116 includes a forward tubular member 138 to which the forward ends of the arms 118 and 120 are secured in any convenient manner such as by welding 140 and a telescopingly extendable tongue element 142 is longitudinally slidably received in the tubular member 138 and is provided with longitudinal pairs of vertically spaced bores 144 and a rear stop abutment plate 146 which is engageable with a transverse member 148 secured between the forward ends of the arms 116 and 118 to limit forward movement of the tongue element 142. In addition, the transverse brace member 148 slidingly supports a vertically reciprocable and spring urged lock pin 150 therefrom and the lower end of the pin 150 is receivable in a selected pair of bores 144 to secure the tongue element 142 in adjusted extended position. The forward end of the tongue element 142 includes a pair of vertically spaced furcations 152 which is suitably apertured as at 154 for receiving a coupling pin (not shown) therethrough.

The expansion spring 132 act as a counterbalance for the tongue assembly 116 and thereby enables the tongue assembly 116 to be lifted clear of the ground at its forward end with little effort for coupling the forward end of the tongue element 142 to a suitable draft vehicle such as a farm tractor.

When the wagon 10 is being towed forwardly, the caster wheel assemblies 34 are in the trailing positions illustrated in FIGS. 1, 3 and 6 of the drawings and the actuating lever 88 is swung to the position thereof illustrated in FIG. 7 whereby the brake bands 46 will apply a friction drag on the brake drums 44. In this manner, the caster wheel assemblies 34 will not vibrate or rapidly oscillate during forward movement of the wagon 10 at road speed. However, when it is desired to back the wagon 10, the actuating lever 88 is shifted to a position with the crosshead 104 thereof seated in the notches 110 so that the caster wheel assemblies 34 will be completely free to oscillate in any direction thereby enabling the wagon 10 to be backed in the same manner in which a semitrailer is backed.

However, should it become necessary to park the wagon 10 on a slope, the actuating lever 88 is pivoted to the position thereof with the crosshead 104 seated in the notches 106 so as to fully brake the caster wheel assemblies 34 against oscillation. This of course will prevent the caster wheel assemblies from turning to a downhill position when the wagon is parked and will thus enable the caster wheel assemblies 34 to be maintained in a cross hill direction so as to prevent the wagon from rolling down the hill.

While it is not necessary that the tongue assembly 116 include an extendable tongue element, such as tongue element 142, the extendability of tongue element 142 enables the lever arm represented by the tongue assembly 116 to be adjusted in length whereby backing operations of the wagon 10 may be more precisely controlled and carried out even in locations where ground traction is poor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A vehicle chassis including a frame having opposite ends, said chassis including ground engaging support wheel means at one end journalled for rotation about a horizontal axis extending transversely of said frame and the other end of said chassis including caster wheel support means oscillatable about upstanding axis, brake means operatively associated with the caster wheel means operable to variably brake the caster wheel means against rotation about its upstanding axis of oscillation, said brake means including control means therefor operable to selectively shift said brake means to a first fully released position, a second fully applied position and a partially applied position.

2. The combination of claim 1 wherein the ground engaging support wheel means at said one end of said chassis includes opposite side ground engaging wheels and the caster wheel means at the other end of said chassis includes opposite side caster wheel assemblies each rotatable about an upstanding axis.

3. The combination of claim 1 wherein said other end of said chassis includes an endwise outwardly projecting tongue assembly adapted at its outer end for securement to a draft vehicle.

4. The combination of claim 3 wherein said tongue assembly is pivotally supported from said chassis for vertical swinging movement of its free end.

5. The combination of claim 4 wherein said tongue assembly includes an endwise extendable section defining the free end of said tongue assembly, and means operable to releasably secure said extendable section in selected extended positions.

6. The combination of claim 1 wherein said other end of said chassis includes an endwise outwardly projecting tongue assembly adapted at its outer end for securement to a draft vehicle, said tongue assembly being pivotally supported from said chassis for vertical swinging movement of its free end, and spring means operatively connected between said tongue assembly and said chassis at least substantially counterbalancing the tongue assembly.

7. The combination of claim 1 wherein said other end of said chassis includes an endwise outwardly projecting tongue assembly adapted at its outer end for securement to a draft vehicle.

8. The combination of claim 7 wherein said tongue assembly is pivotally supported from said chassis for vertical swinging movement of its free end.

9. The combination of claim 8 wherein the ground engaging support wheel means at said one end of said chassis includes opposite side ground engaging wheels and the caster wheel means at the other end of said chassis includes opposite side caster wheel assemblies each rotatable about an upstanding axis.

10. The combination of claim 1 wherein said control means includes a lever oscillatably supported from said frame and shiftable between first and second limit positions corresponding to the first mentioned first and second positions and a third position intermediate the second mentioned first and second positions corresponding to said partially applied position of said brake means, and means operative to selectively releasably retain said lever in its first, second and third positions.

References Cited

UNITED STATES PATENTS

| | | | |
|---|---|---|---|
| 383,183 | 5/1888 | Leavell | 280—489VX |
| 1,365,013 | 1/1921 | Wright | 280—489 |
| 1,840,435 | 1/1932 | Davis | 280—489 |
| 1,937,596 | 12/1933 | Ronan | 16—35X(D) |
| 2,181,722 | 11/1939 | Butter et al. | 16—35X(D) |
| 2,306,179 | 12/1942 | Mulholland | 16—35(D) |
| 2,591,312 | 4/1952 | Stees | 287—58(CT) |
| 2,634,986 | 4/1953 | McDaniel | 280—489 |
| 2,656,995 | 10/1953 | Wolf | 16—35X(D) |
| 2,796,266 | 6/1957 | Sells | 280—408X |
| 2,978,275 | 4/1961 | Williams | 298—22 |
| 3,075,233 | 1/1963 | Lorenz | 16—35(D) |
| 3,194,578 | 7/1965 | Kiecker | 16—35X |

LEO FRIAGLIA, Primary Examiner

U.S. Cl. X.R.

16—35; 188—9, 77; 280—80, 482